(12) United States Patent
Soriaga et al.

(10) Patent No.: US 11,737,059 B2
(45) Date of Patent: Aug. 22, 2023

(54) SIGNALING FOR SLOT AGGREGATION

(71) Applicant: QUALCOMM Incorporated, San Diego, CA (US)

(72) Inventors: Joseph Binamira Soriaga, San Diego, CA (US); Jing Sun, San Diego, CA (US); Wanshi Chen, San Diego, CA (US); Heechoon Lee, San Diego, CA (US); Peter Gaal, San Diego, CA (US); Alexandros Manolakos, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 16/255,779

(22) Filed: Jan. 23, 2019

(65) Prior Publication Data

US 2019/0230656 A1 Jul. 25, 2019

Related U.S. Application Data

(60) Provisional application No. 62/621,555, filed on Jan. 24, 2018.

(51) Int. Cl.
*H04W 4/00* (2018.01)
*H04W 72/0446* (2023.01)
(Continued)

(52) U.S. Cl.
CPC ........... *H04W 72/0446* (2013.01); *H04L 1/08* (2013.01); *H04L 1/1812* (2013.01);
(Continued)

(58) Field of Classification Search
None
See application file for complete search history.

(56) References Cited

U.S. PATENT DOCUMENTS 6,952,454 B1 10/2005 Jalali et al.
8,310,981 B2 11/2012 Damnjanovic et al.
(Continued)

FOREIGN PATENT DOCUMENTS

WO 2002005506 1/2002
WO 2010048426 4/2010
WO 2016089184 A1 6/2016

OTHER PUBLICATIONS

CATR: "Discussion on the Remaining Details of Time Domain Allocation", 3GPP Draft; R1-1800763, 3rd Generation Partnership Project (3GPP), Mobile Competence Centre ; 650, Route Des Lucioles ; F-06921 Sophia-Antipolis Cedex; France, vol. RAN WG1, No. Vancouver, Canada; Jan. 22, 2018-Jan. 26, 2018, Jan. 12, 2018 (Jan. 12, 2018), XP051384419, 3 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018], p. 1. section 1, p. 2. section 2.2. Q1, p. 2. section 2.2. Q2, p. 2. section 2.2. Q3.

(Continued)

*Primary Examiner* — Zewdu A Beyen
(74) *Attorney, Agent, or Firm* — Patterson+ Sheridan, L.L.P.

(57) ABSTRACT

Certain aspects of the present disclosure provide techniques for slot aggregation in new radio (NR) systems. A method of wireless communication by a user equipment (UE) includes receiving radio resource control (RRC) signaling providing a semi-static configuration for transmission and/or reception of a repeated transport block (TB) and/or a different TB in each of a plurality of aggregated slots. The UE transmits or receives the TBs in the plurality of aggregated slots based on the semi-static configuration. Another method is provided in which the UE transmits and/or receives a demodulation reference signal (DMRS) in each of a plurality of aggregated slots, each DMRS associated with a repeated TB or a (Continued)

different TB in the slot. The UE determines, based on received signaling, whether the DMRS use a same precoder or a different precoder and modulates and/or demodulates the TBs in the plurality of aggregated slots based on the determination.

30 Claims, 20 Drawing Sheets

(51) Int. Cl.
    *H04L 1/1812*     (2023.01)
    *H04L 5/00*     (2006.01)
    *H04L 1/08*     (2006.01)
    *H04L 1/1867*     (2023.01)
    *H04W 72/23*     (2023.01)

(52) U.S. Cl.
    CPC .......... *H04L 1/1896* (2013.01); *H04L 5/0051* (2013.01); *H04W 72/23* (2023.01)

(56) References Cited

U.S. PATENT DOCUMENTS

| | | | | |
|---|---|---|---|---|
| 2016/0036618 A1* | 2/2016 | Einhaus | ............ | H04W 72/1263 370/329 |
| 2016/0269160 A1 | 9/2016 | Noh et al. | | |
| 2016/0309467 A1* | 10/2016 | Yerramalli | ........ | H04W 72/0446 |
| 2017/0201968 A1* | 7/2017 | Nam | ..................... | H04L 5/0048 |

OTHER PUBLICATIONS

Partial International Search Report—PCT/US2019/014977—ISA/EPO—dated Jul. 19, 2019.
Samsung: "Slot Aggregation", 3GPP Draft; R1-1705400 NR Slot Aggregation, 3rd Generation Partnership Project (3GPP), Mobile Competence Centre ;650, Route Des Lucioles ; F-06921 Sophia-Antipolis Cedex ; France, vol. RAN WG1, No. Spokane, USA; Apr. 3, 2017-Apr. 7, 2017, Mar. 24, 2017 (Mar. 24, 2017), XP051250685, 2 Pages, Retrieved from the Internet: URL:http://www.3gpp.org/ftp/tsg_ran/WG1_RL1/TSGR1_88b/Docs/ [retrieved on Mar. 24, 2017], p. 2, section 2, Option 2.
International Search Report and Written Opinion—PCT/US2019/014977—ISA/EPO—dated Oct. 9, 2019.
Samsung: "Slot Aggregation in DL", 3GPP Draft; R1-1700962-NR Slot Aggregation, 3rd Generation Partnership Project (3GPP), Mobile Competence Centre, 650 Route Des Lucioles, F-06921, Sophia-Antipolis Cedex, France, vol. RAN WG1, Spokane, USA; Jan. 16, 2017-Jan. 20, 2017, Jan. 16, 2017 (Jan. 16, 2017) XP051208478, 3 pages, Retrieved from the Internet: URL: http://www.3gpp.org/ftp/Meetings_3GPP_SYNC/RAN1/Docs/ [retrieved on Jan. 16, 2017], p. 2, par. 2, figure 1.
Taiwan Search Report—TW108102726—TIPO—dated Feb. 10, 2022.

* cited by examiner

| DMRS for CE | HARQ Timing Parameter | Units | 15 kHz SCS | 30 kHz SCS | 60 kHz SCS | 120 kHz SCS |
|---|---|---|---|---|---|---|
| Front-loaded DMRS only | N1 | Symbols | 8 | 10 | 17 | 20 |
| Front-loaded + additional DMRS | N1 | Symbols | 13 | 13 | 20 | 24 |
| Frequency First | N2 | Symbols | 10 | 12 | 23 | 36 |

FIG. 16

| DMRS for CE | HARQ Timing Parameter | Units | 15 kHz SCS | 30 kHz SCS | 60 kHz SCS |
|---|---|---|---|---|---|
| Front-loaded DMRS only | N1 | Symbols | 3 | 4.5 | 9 |
| Frequency First | N2 | Symbols | 5 | 5.5 | 11 |

FIG. 17

SIGNALING FOR SLOT AGGREGATION

CROSS-REFERENCE TO RELATED APPLICATION & PRIORITY CLAIM

This application claims benefit of and priority to U.S. Provisional Patent Application Ser. No. 62/621,555, filed Jan. 24, 2018, herein incorporated by reference in its entirety as if fully set forth below and for all applicable purposes.

BACKGROUND

Field of the Disclosure

Aspects of the present disclosure relate to wireless communications, and more particularly, to techniques signaling of slot aggregation in certain systems, such as in new radio (NR) systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for signaling of slot aggregation in certain systems, such as new radio (NR) systems.

Certain aspects of the present disclosure provide a method for wireless communication that may be performed, for example, by a user equipment (UE). The method generally includes receiving radio resource control (RRC) signaling providing the UE with a semi-static configuration for transmission or reception of a repeated transport block (TB) and/or a different TB in each of a plurality of aggregated slots. The method includes transmitting or receiving the TBs in the plurality of aggregated slots based on the semi-static configuration.

Certain aspects of the present disclosure provide an apparatus for wireless communication such as a UE. The apparatus generally includes means for receiving RRC signaling providing the apparatus with a semi-static configuration for transmission or reception of a repeated TB and/or a different TB in each of a plurality of aggregated slots. The apparatus includes means for transmitting or receiving the TBs in the plurality of aggregated slots based on the semi-static configuration.

Certain aspects of the present disclosure provide an apparatus for wireless communication such as a UE. The apparatus generally includes a receiver configured to receive RRC signaling providing the apparatus with a semi-static configuration for transmission or reception of a repeated TB and/or a different TB in each of a plurality of aggregated slots. The apparatus includes a transceiver configured to transmit or receive the TBs in the plurality of aggregated slots based on the semi-static configuration.

Certain aspects of the present disclosure provide a computer readable medium having computer executable code stored thereon for wireless communication by a UE. The computer executable code generally includes code for receiving RRC signaling providing the UE with a semi-static configuration for transmission or reception of a repeated TB and/or a different TB in each of a plurality of aggregated slots. The computer executable code includes code for transmitting or receiving the TBs in the plurality of aggregated slots based on the semi-static configuration.

Certain aspects of the present disclosure provide another method for wireless communication that may be performed, for example, by a UE. The method generally includes receiving a demodulation reference signal (DMRS) in each of a plurality of aggregated slots. Each DMRS is associated with a repeated TB or a different TB in the slot. The method includes determining, based on received signaling, whether the DMRS use a same precoder or a different precoder. The method includes demodulating the TBs in the plurality of aggregated slots based on the determination.

Certain aspects of the present disclosure provide an apparatus for wireless communication such as a UE. The apparatus generally includes means for receiving a DMRS in each of a plurality of aggregated slots. Each DMRS is associated with a repeated TB or a different TB in the slot. The apparatus includes means for determining, based on received signaling, whether the DMRS use a same precoder or a different precoder. The apparatus includes means for demodulating the TBs in the plurality of aggregated slots based on the determination.

Certain aspects of the present disclosure provide an apparatus for wireless communication such as a UE. The apparatus generally includes a receiver configured to receive a DMRS in each of a plurality of aggregated slots. Each DMRS is associated with a repeated TB or a different TB in the slot. The apparatus includes at least one processor coupled with a memory and configured to determine, based on received signaling, whether the DMRS use a same precoder or a different precoder. The at least one processor is configured to demodulate the TBs in the plurality of aggregated slots based on the determination.

Certain aspects of the present disclosure provide a computer readable medium having computer executable code stored thereon for wireless communication by a UE. The computer executable code generally includes code for receiving a DMRS in each of a plurality of aggregated slots. Each DMRS is associated with a repeated TB or a different TB in the slot. The computer executable code includes code for determining, based on received signaling, whether the DMRS use a same precoder or a different precoder. The computer executable code includes code for demodulating the TBs in the plurality of aggregated slots based on the determination.

Aspects generally include methods, apparatus, systems, computer readable mediums, and processing systems, as substantially described herein with reference to and as illustrated by the accompanying drawings, and including for operations by a base station (BS) that may be complementary to the operations by the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 16 is a table of UE processing times and hybrid automatic repeated request (HARQ) timing, in accordance with certain aspects of the present disclosure.

FIG. 17 is a table of aggressive UE processing times and HARQ timing, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
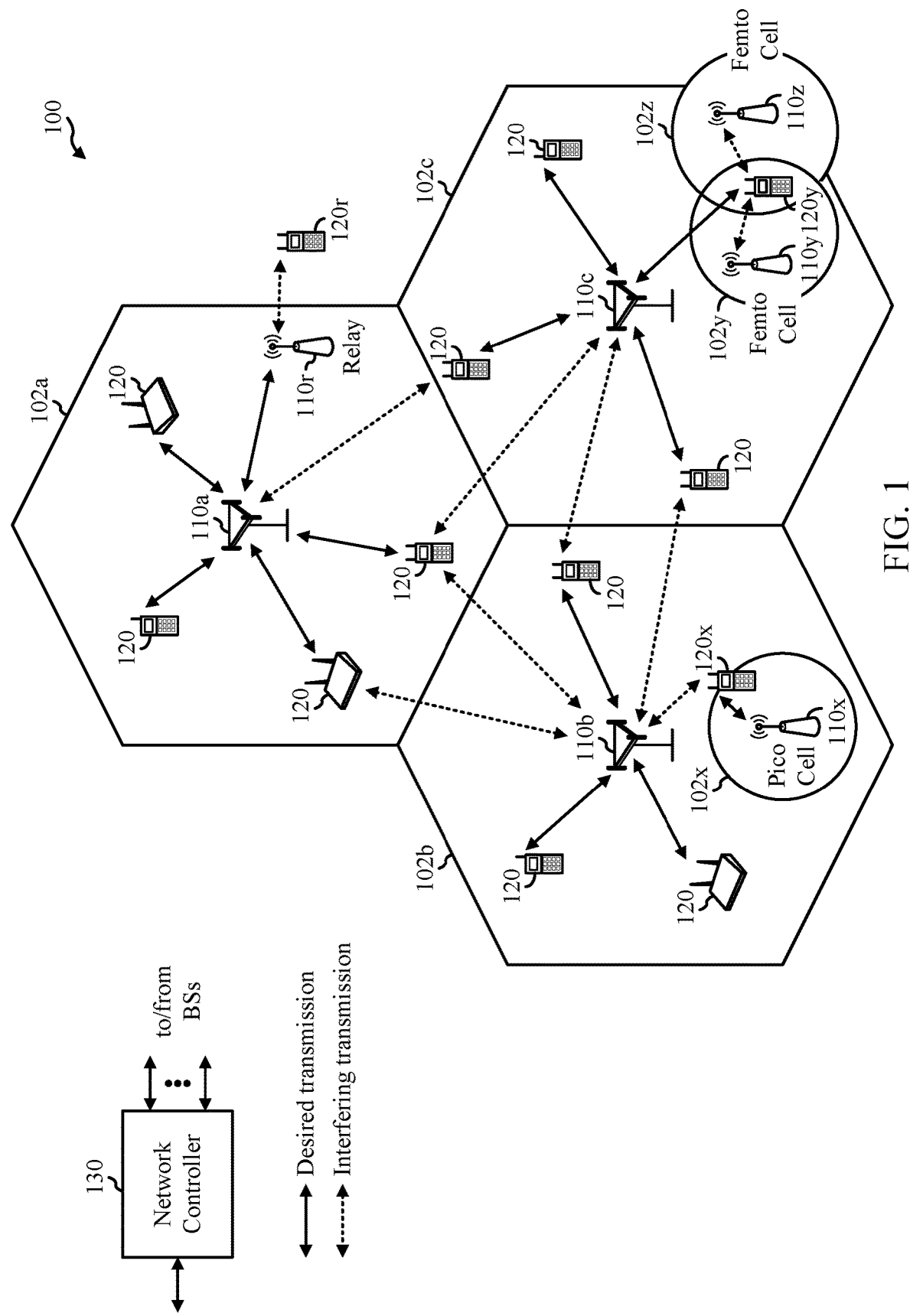
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). In certain systems, such as NR, slot aggregation may be supported. The aggregated slots may include uplink and/or downlink slots. The aggregated slots may include consecutive slots in which transport blocks (TBs) are transmitted and/or received. The TBs may be repetitions (e.g., associated with a same hybrid automatic repeat request (HARQ) process) or different (e.g., associated with different HARQ processes). Precoded demodulation reference signals (DMRS) may be transmitted and/or received in the uplink and/or downlink slots with the TBs.

Aspects of the present disclosure provide techniques and apparatus for signaling slot aggregation. For example, techniques are provided for configuring/signaling the aggregated slots, such as whether TBs transmitted in the slots are repetitions or different TBs, whether DRMS in the slots are phase continuous, and/or parameters associated with the aggregated slots such as modulation coding scheme (MCS), redundancy version (RV), resource allocation (RA), new data indicator (NDI), acknowledgment resource indicator (ARI), etc. Aspects provide radio resource control (RRC) signaling to semi-statically configure a user equipment (UE) with the slots aggregation configuration and/or downlink control information (DCI) to dynamically configure or reconfigure the slot aggregation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a New Radio (NR) or 5G network. A UE 120 in the wireless communication network 100 can receive radio resource control (RRC) signaling from a BS 110 in the wireless communication network 100. The RRC signaling may semi-statically configure the UE 120 for slot aggregation. For example, the UE 120 may be configured to transmit and/or receive transport blocks (TBs) in the aggregated slots. The TBs may be repetitions or different TBs. The UE 120 may then transmit or receive the TBs in accordance with the RRC configuration. The UE 120 may also determine, for example based on further RRC signaling from the BS 110, whether the demodulation reference signal (DMRS) in aggregated slots are phase continuous. The UE 120 can then demodulate TBs received in the downlink aggregated slots, and/or modulate TBs transmitted in the uplink aggregated slots, based on the determination.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
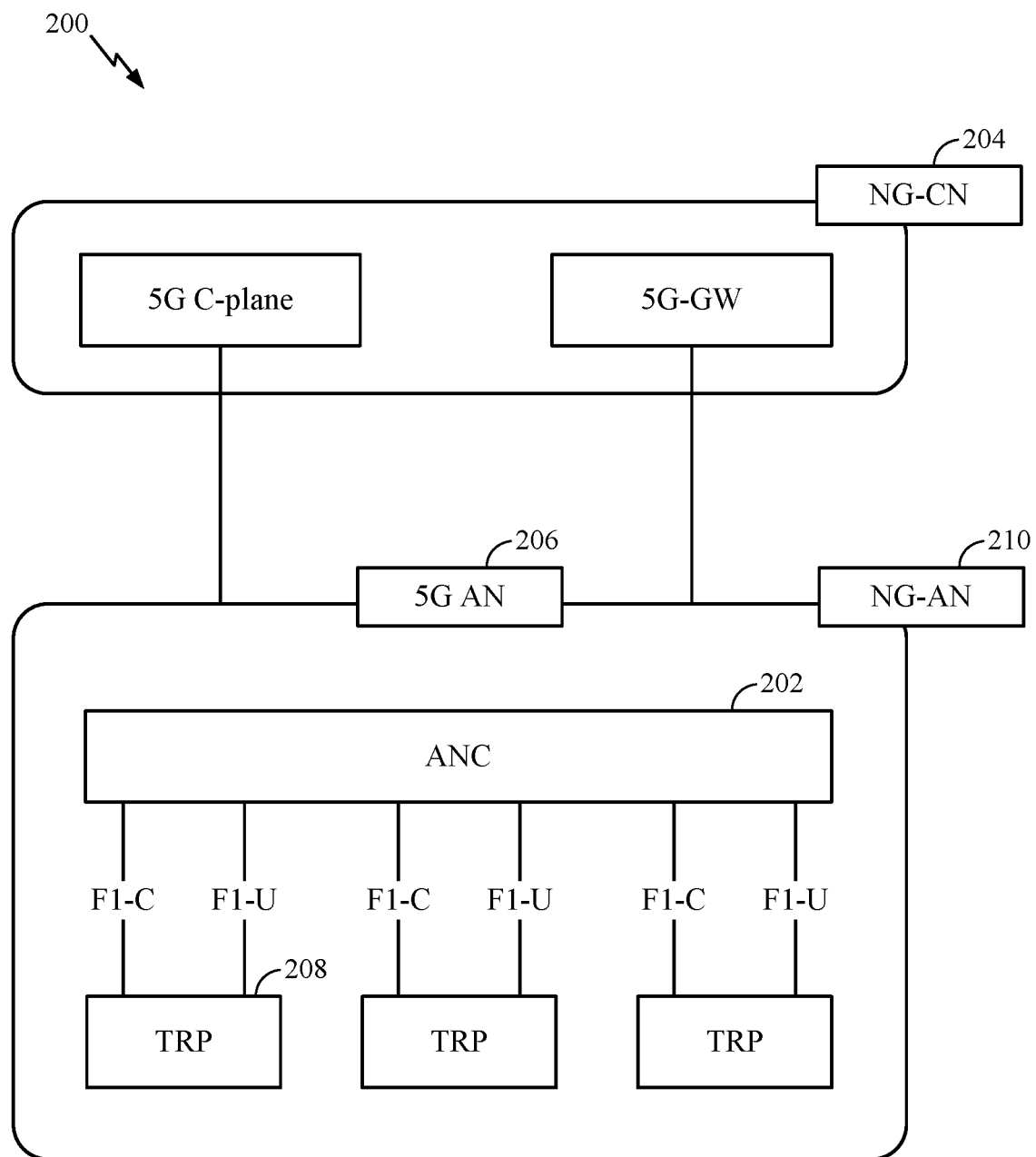
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
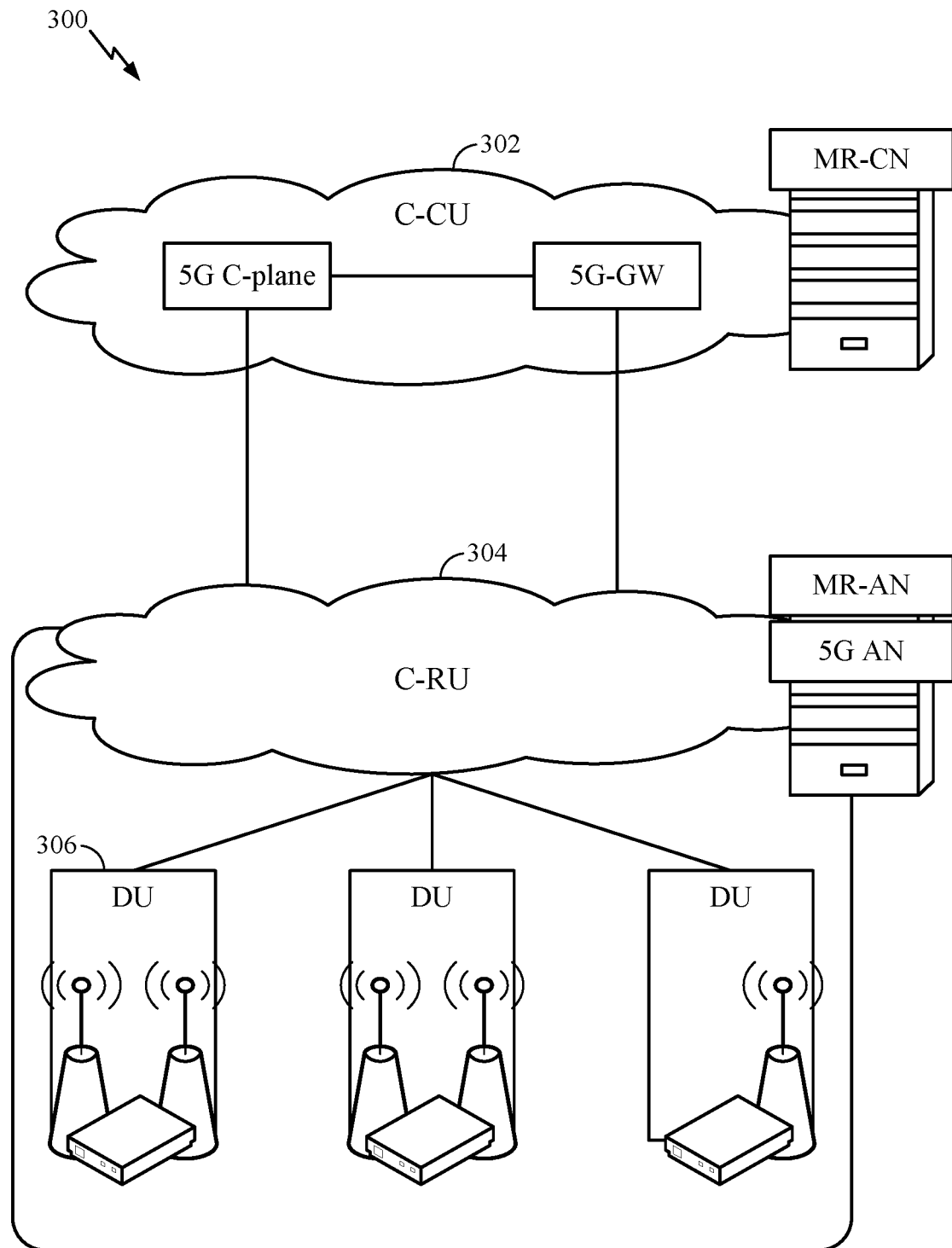
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
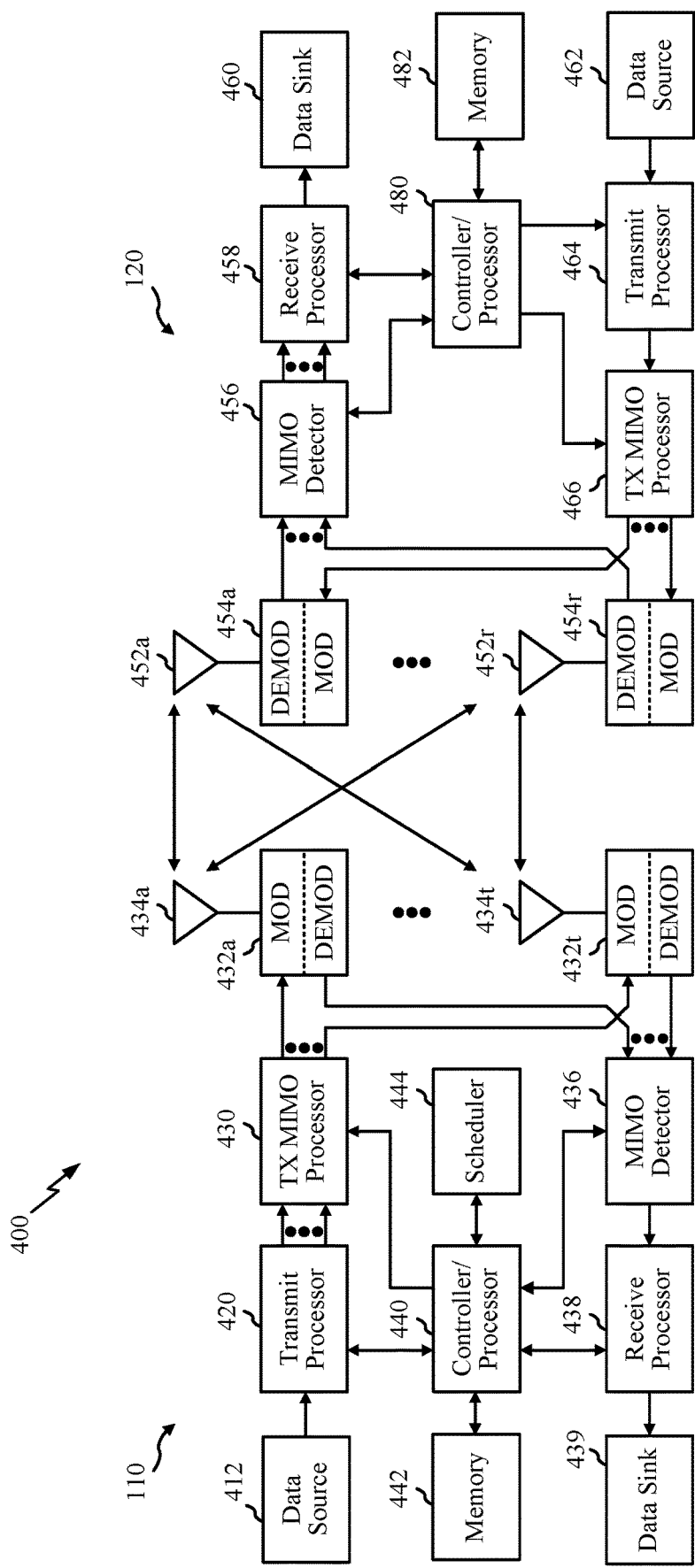
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein and illustrated with reference to FIGS. 10-13.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
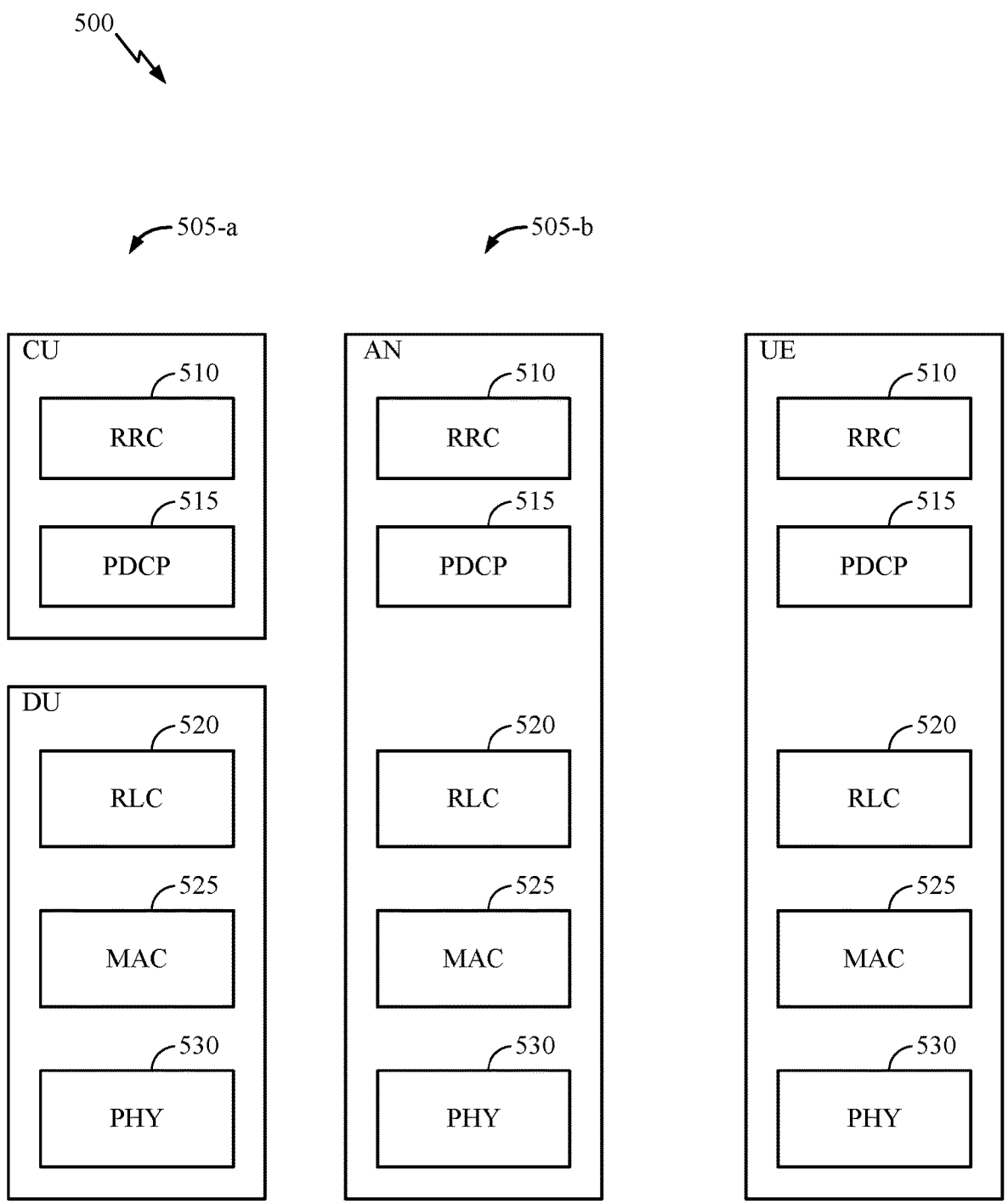
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

FIG. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
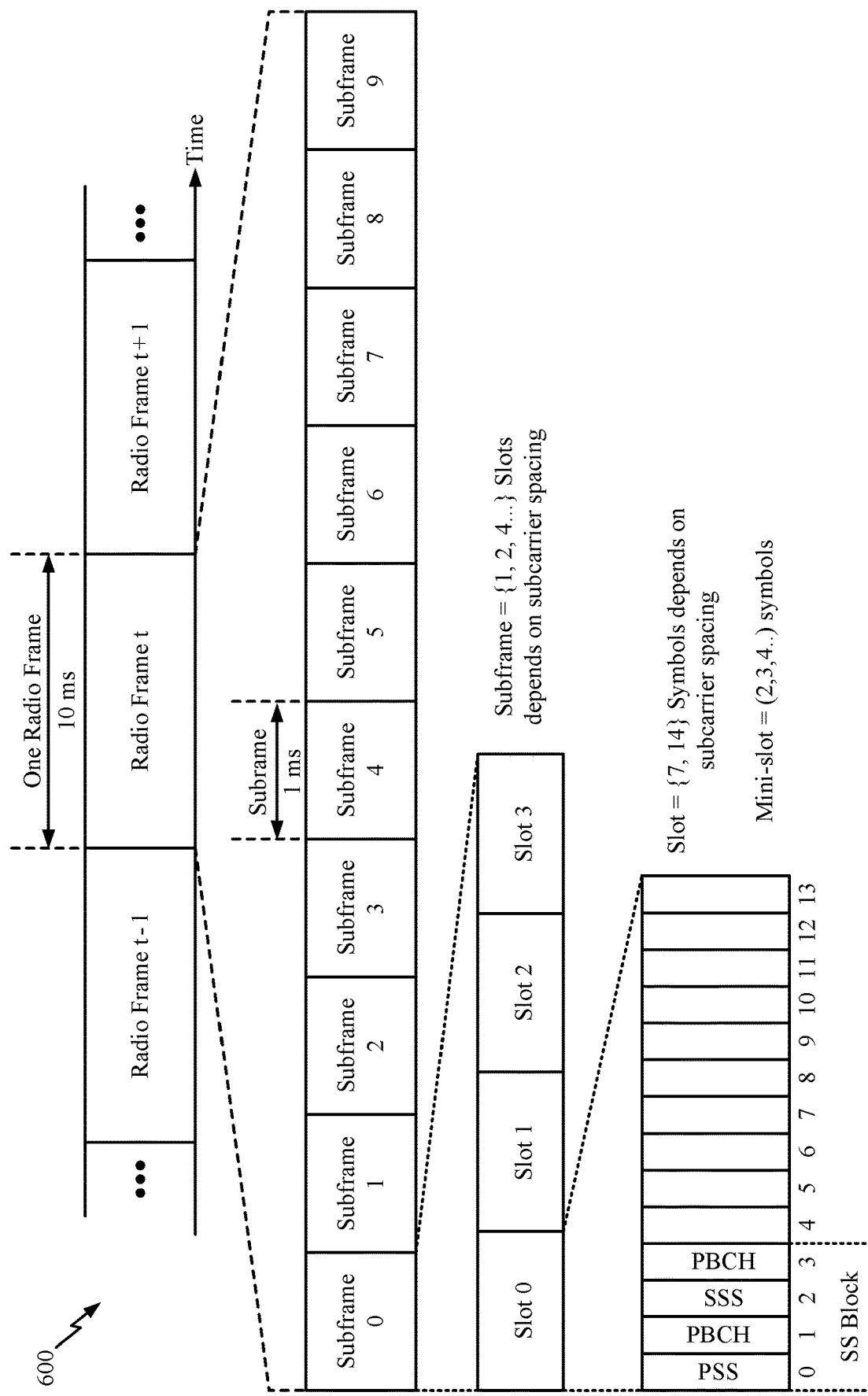
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Signaling for Slot Aggregation

Aspects of the present disclosure provide apparatus, methods, processing systems, and computer readable mediums for slot aggregation signaling that may be used in new radio systems (e.g., 5G NR systems). NR may support slot aggregation. Slot aggregation may refer to a case of assignments for multiple consecutive slots. The aggregated slots may include uplink and/or downlink slots. The aggregated slots may include consecutive slots in which transmissions (e.g., transport blocks (TBs)) are sent (e.g., on the physical uplink shared channel (PUSCH)) and/or received (e.g., on the physical downlink shared channel (PDSCH)). Transmissions in the aggregated slots may include repeated TBs (e.g., repetitions associated with a same hybrid automatic repeat request (HARQ) process) or different TBs (e.g., non-repeated and associated with different HARQ processes).

Figure 7:
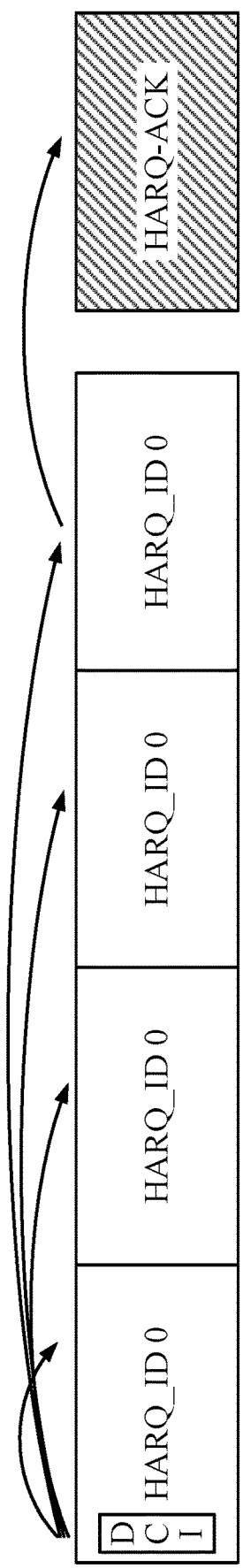
FIG. 7 is a block diagram illustrating a type of slot aggregation, in accordance with certain aspects of the present disclosure.
Figure 8:
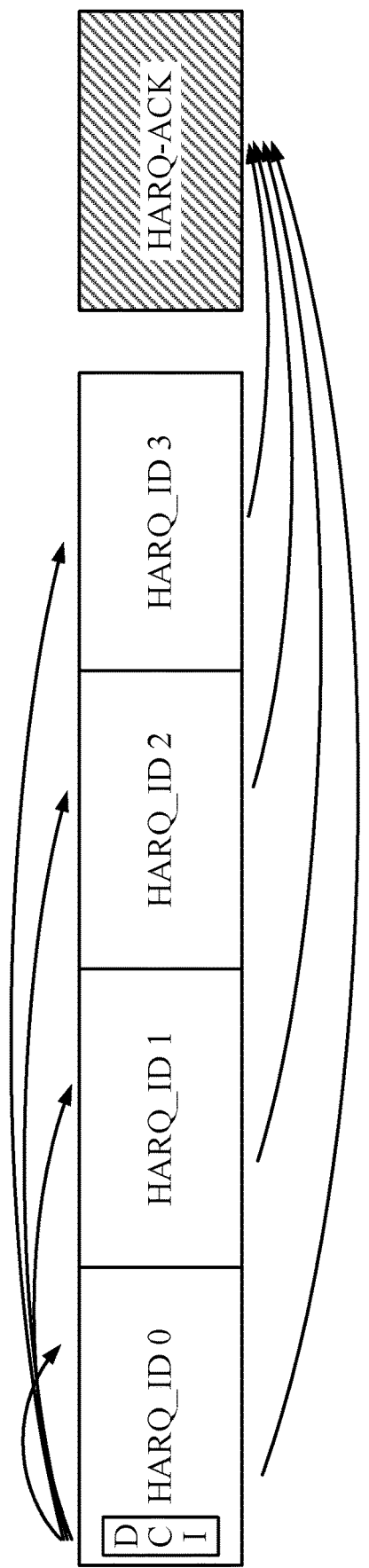
FIG. 8 is a block diagram illustrating another type of slot aggregation, in accordance with certain aspects of the present disclosure.
Figure 9:
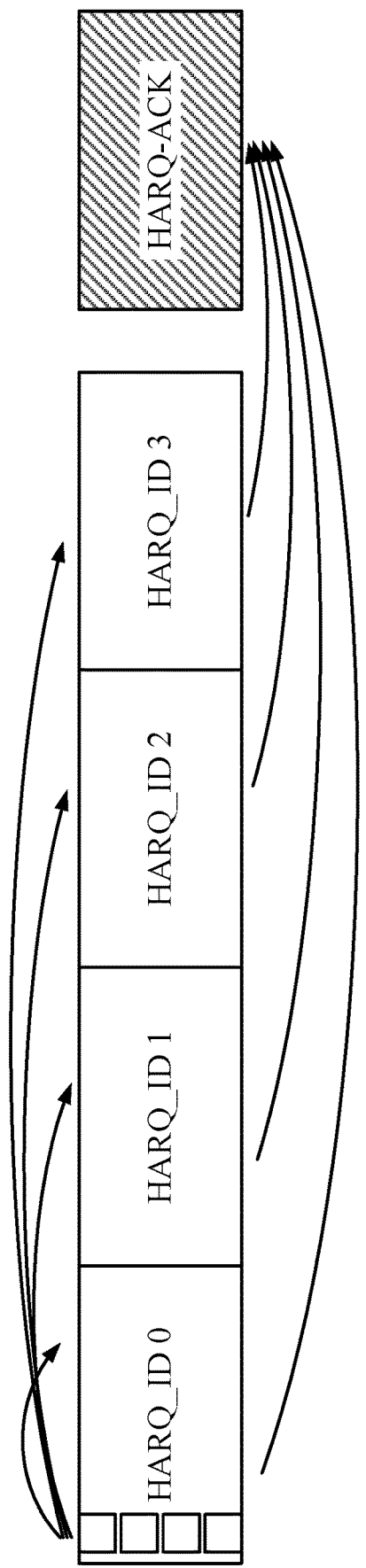
FIG. 9 is a block diagram illustrating another type of slot aggregation, in accordance with certain aspects of the present disclosure.

FIGS. 7-9 show examples of slot aggregation. Although FIGS. 7-9 illustrates slots aggregation for reception of downlink data (e.g., PDSCH), one will understand how similar slot aggregation configurations would apply for transmission of uplink data (e.g., PUSCH). For example, while the FIGS. 7-9 show downlink control information (DCI) overlapping a scheduled slot, in the case of uplink (e.g., PUSCH) the DCI may be be transmitted in an earlier slot than the slot scheduled for UL transmission. Further, in the case UL, the user equipment (UE) may not send the HARQ-ACK.

As shown the slot aggregation example in FIG. 7, a single downlink link information (DCI) transmission (e.g., a single grant) may be received in a slot. For example, the DCI may be received in a control region of the slot, such as the physical downlink control channel (PDCCH). The DCI can schedule repetitions of a TB (e.g., HARQ_ID 0) in multiple consecutive slots. An acknowledgment (ACK) may be sent after the last scheduled repetition to acknowledge whether the TB was successfully received.

As shown in FIG. 8, in another example of slot aggregation, a single DCI (e.g., a single grant) in a slot is used for multi-grant scheduling. For example, the DCI can schedule multiple different TBs (e.g., non-repeated and associated with the different HARQ process numbers) in multiple (e.g., consecutive) slots. A single ACK may be sent for all of the multiple TBs. The ACK may acknowledge whether each of the different TBs was successfully received. The DCI may also schedule the HARQ ACK process for each of the different TBs.

As shown in FIG. 9, in yet another example of slot aggregation, multiple DCI may be sent/received in a slot. For example, the multiple DCI may be frequency division multiplexed (FDMed) in the slot. The multiple DCI may be for dynamic HARQ scheduling. For example, the multiple DCI can schedule multiple TBs (e.g., non-repeated and associated with the different HARQ process numbers) in multiple (e.g., consecutive) slots. Each of the multiple DCI may schedule a TB for a different slot. A single ACK may be sent for all of the multiple TBs. The single ACK may acknowledge whether each of the different TBs was successfully received. Although not shown in FIG. 9, in some examples, the multiple DCI can schedule some slots with repetitions of a TB and some slots with different TBs.

Precoded demodulation reference signals (DMRS) may be transmitted/received in the aggregated slots with the TBs. For example, on the uplink the UE may transmit precoded DMRS to the BS, and on the downlink the UE may receive precoded DMRS from the BS. In the case of slot-aggregation with multiple consecutive downlink data transmissions, the BS may transmit, and the UE receives, DMRS in each of the aggregated slots. For any frequency allocation, if phase continuity can be guaranteed at the base station (e.g., a gNB) and the DMRS across multiple aggregated slots utilize the same precoder in time, then the DMRS for the aggregated slots can be coherently processed. In other words, depending on whether DMRS across aggregated-slots are phase-continuous (and follow the same precoder) or not phase-continuous, the UE may apply different optimal channel estimation schemes. Thus, it is desirable for the BS, in the case of slot-aggregation, to indicate whether the UE can assume phase-continuous, and same-precoding, DMRS across multiple slots or whether the UE cannot used phase-continuous DMRS across the slots.

Accordingly, aspects of the present disclosure provide techniques and apparatus for signaling slot aggregation. For example, techniques are provides for configuring/signaling the aggregated slots, whether TBs transmitted in the slots are repetitions or different TBs, whether DRMS in the slots are phase-continuous, and/or parameters associated with the aggregated slots such as modulation coding scheme (MCS), redundancy version (RV), resource allocation (RA), new data indicator (NDI), acknowledgment resource indicator (ARI), etc. Aspects provide radio resource control (RRC) signaling to semi-statically configure a UE with the slots aggregation configuration and/or DCI to dynamically configure or reconfigure the slot aggregation. In some examples, the signaling the UL slots aggregation and DL slot aggregation may be separate (e.g., based on link budgets, peaks, overhead, etc.).

Figure 10:
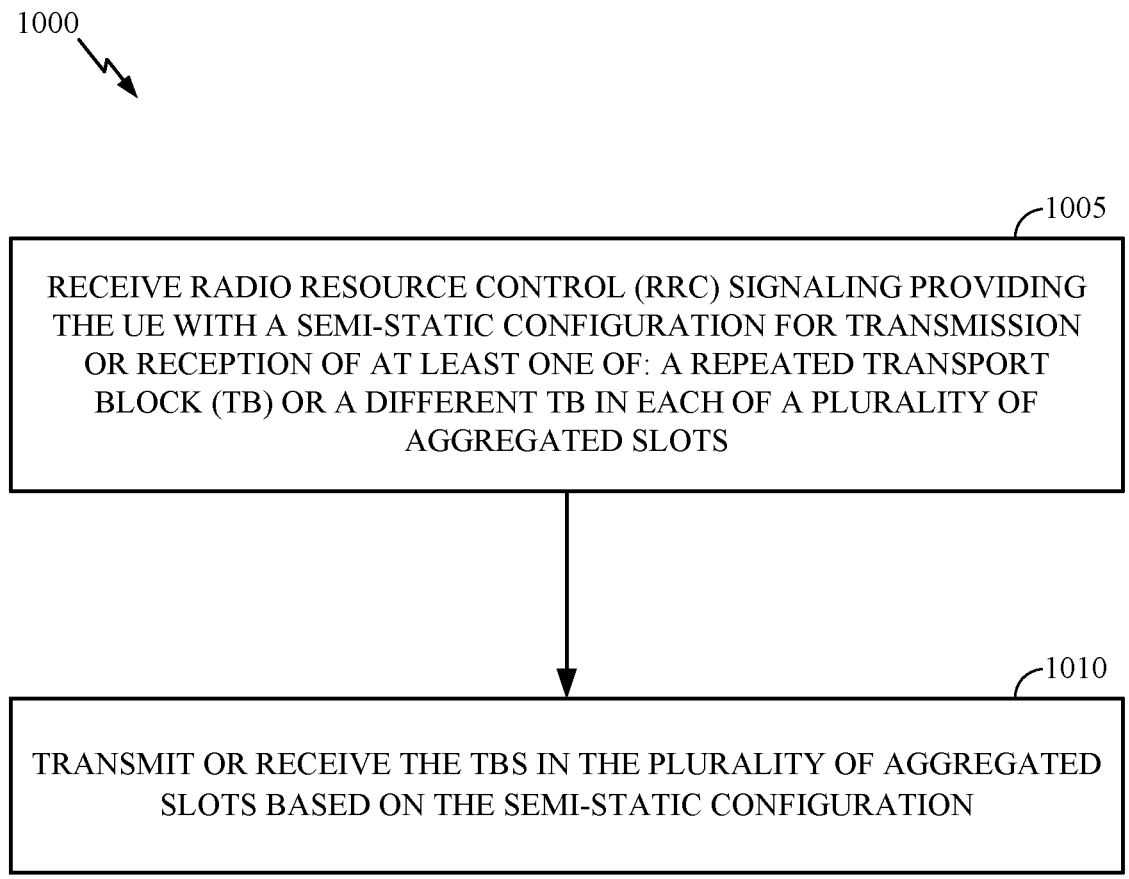
FIG. 10 is a flow diagram illustrating example operations that may be performed by a UE for receiving signaling for slot aggregation, in accordance with certain aspects of the present disclosure.

FIG. 10 is a flow diagram illustrating example operations 1000 for wireless communications, in accordance with certain aspects of the present disclosure. The operations 1000 may be performed by a UE (e.g., such as one of the UEs 120 illustrated in the wireless communication network 100 in FIG. 1). Operations 1000 may be implemented as software components that are executed and run on one or more processors (e.g., processor 480 of FIG. 4). Further, the transmission and reception of signals by the UE in operations 1000 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 1000 may begin, at 1105, by receiving RRC signaling providing the UE with a semi-static configuration. The semi-static configuration configures the UE to transmit or receive TBs in the plurality of aggregated slots. The semi-static configuration may configure the UE to transmit or receive repetitions of the TB, different TBs, and/or a combination of repeated and non-repeated TBs. The semi-static configuration may configure slot aggregation parameters (e.g., values for the parameters), such as the RA, MCS, NDI, RV, ARI for a bundled ACK, and/or other parameters for transmission or reception of the TBs in the aggregated slots. In some examples, the semi-static configuration configures a same RA, MCS, NDI, RV, and/or ARI for transmission of different TBs in the plurality of aggregated slots.

At 1010, the UE transmits or receives the TBs in the plurality of aggregated slots based on (e.g., in accordance with) the semi-static configuration.

The UE may receive a DCI scheduling the UE to transmit or receive repetitions of a TB in aggregated slots. The repetitions of the TB may be associated with a bundled physical downlink shared channel (PDSCH). The UE may receive a DCI scheduling the UE to transmit or receive different TBs in the aggregated slots. The UE may receive or transmit a single ACK bit indicating whether the TBs in the plurality of aggregated slots were successfully received. In some examples, a DCI may dynamically configure (e.g., reconfigure or override) one or more of the semi-static RRC configured aggregation parameters.

Figure 10A:
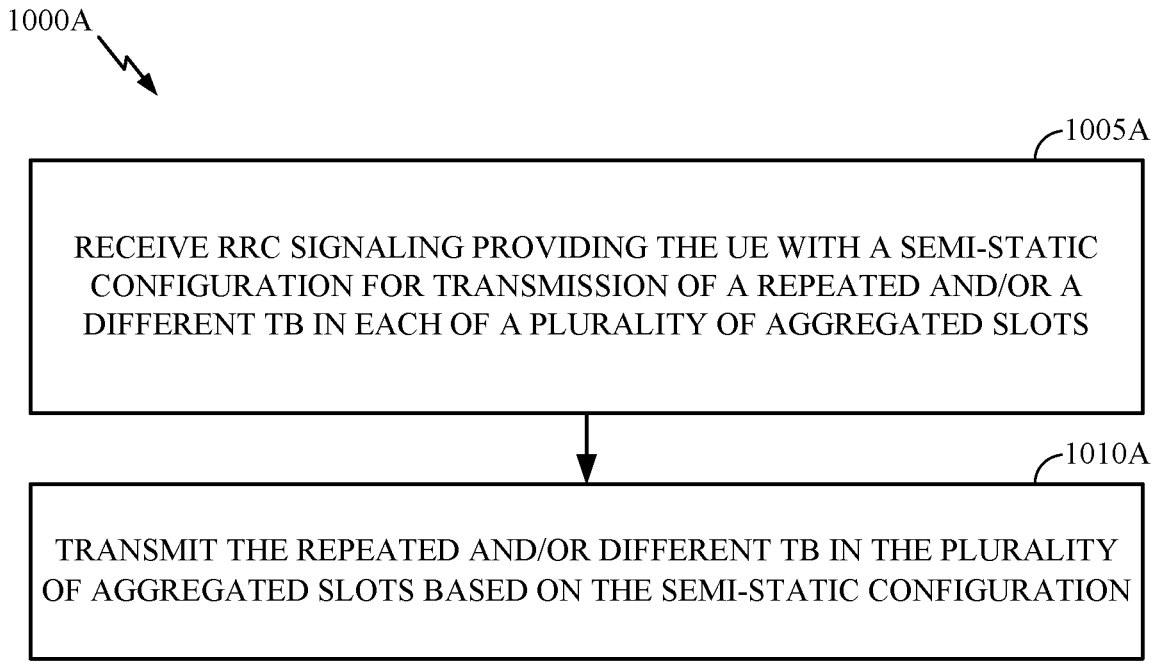
FIG. 10A is a flow diagram illustrating example operations by the UE for uplink slot aggregation, in accordance with certain aspects of the present disclosure.

FIG. 10A is a flow diagram illustrating example operations 1000A by the UE for uplink slot aggregation, in accordance with certain aspects of the present disclosure. The operations 1000A may begin, at 1005A, by receiving RRC signaling providing the UE with a semi-static configuration for transmission of a repeated and/or different TB in each of the plurality of aggregated slots. At 1010A, the UE transmits the repeated and/or different TBs in the plurality of aggregated slots based on the semi-static configuration.

Figure 10B:
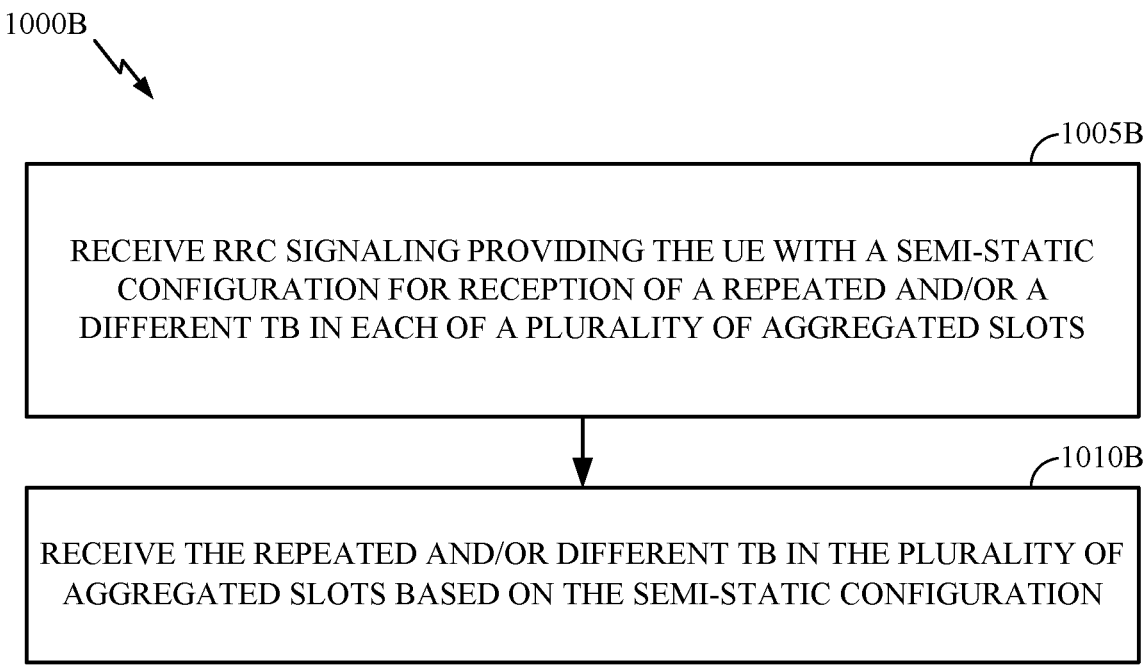
FIG. 10B is a flow diagram illustrating example operations by the UE for downlink slot aggregation, in accordance with certain aspects of the present disclosure.

FIG. 10B is a flow diagram illustrating example operations 1000A for downlink slot aggregation, in accordance with certain aspects of the present disclosure. The operations 1000B may begin, at 1005B, by receiving RRC signaling providing the UE with a semi-static configuration for reception of a repeated and/or different TB in each of the plurality of aggregated slots. At 1010B, the UE receives the repeated and/or different TBs in the plurality of aggregated slots based on the semi-static configuration.

Figure 11:
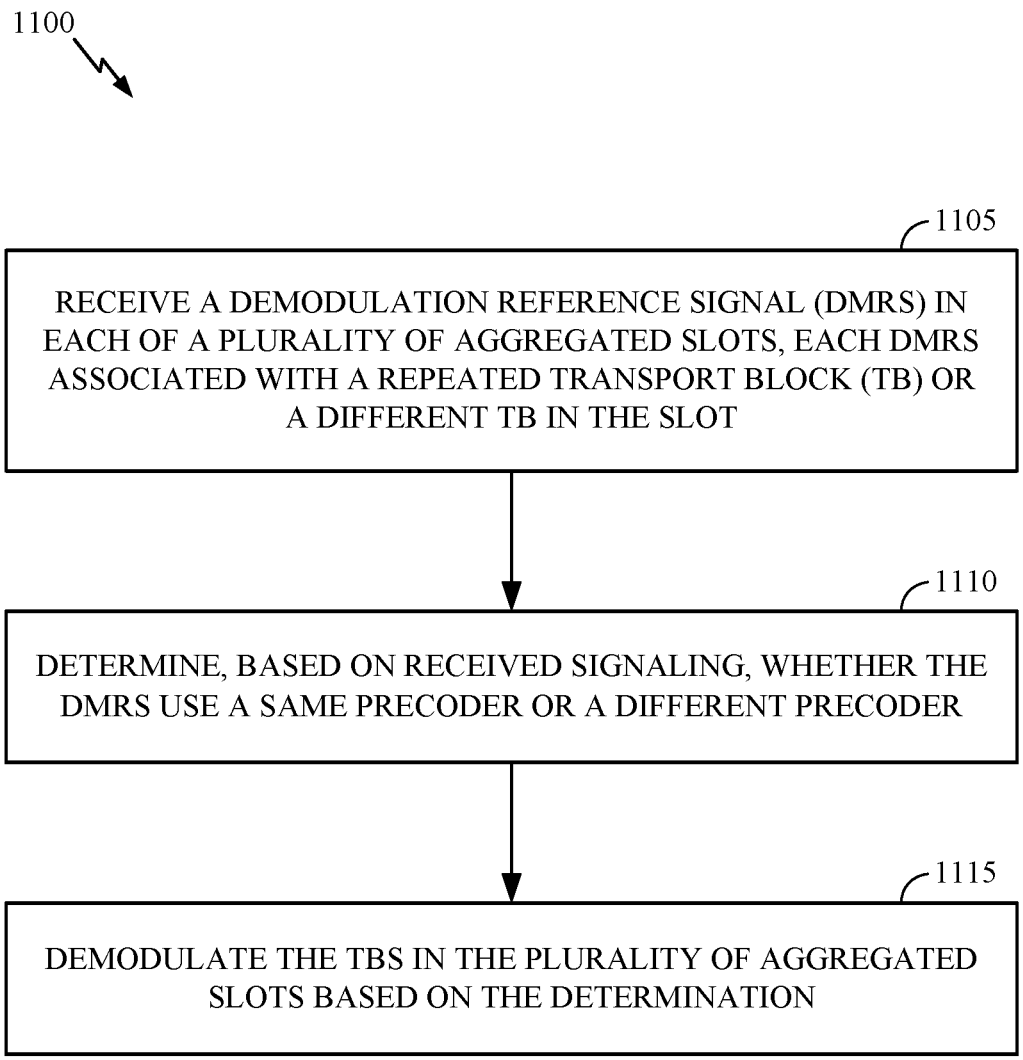
FIG. 11 is a flow diagram illustrating example operations that may be performed by a UE for receiving signaling for demodulation reference signal (DMRS) phase continuity and DMRS demodulation, in accordance with certain aspects of the present disclosure.

FIG. 11 is a flow diagram illustrating example operations 1100 for wireless communications, in accordance with certain aspects of the present disclosure. The operations 1100 may be performed by the UE. The operations 1100 may begin, at 1105, by receiving a DMRS in each of a plurality of aggregated slots. Each DMRS is associated with a repeated TB or a different TB in the slot.

At 1110, the UE determines, based on received signaling, whether the DMRS use a same precoder or a different precoder. In some examples, the UE receives RRC or DCI signaling. The RRC or DCI signaling may explicitly or implicitly indicate the DMRS are phase-continuous in time across the aggregated slots (e.g., the DMRS use the same precoding across the aggregated slots). The RRC or DCI signaling may indicate for the UE to assume the DMRS uses the same precoder if DMRS is received in consecutive downlink slots. For any resource block (RB) in frequency, the precoder used in consecutive aggregated slots may be the same or different.

At 1115, the UE demodulates the TBs in the plurality of aggregated slots based on the determination. For example, if the UE determines that the DMRS do not use the same precoder, then the UE may demodulate a TB in a slot based only on the DMRS received in that slot. On the other hand, if the UE determines that the DMRS use the same precoding, then the UE may demodulate a TB in a slot based on all of (or multiple) the DMRS in the aggregated slots (e.g., using coherent combining). The DMRS may be used for channel estimation.

Figure 12:
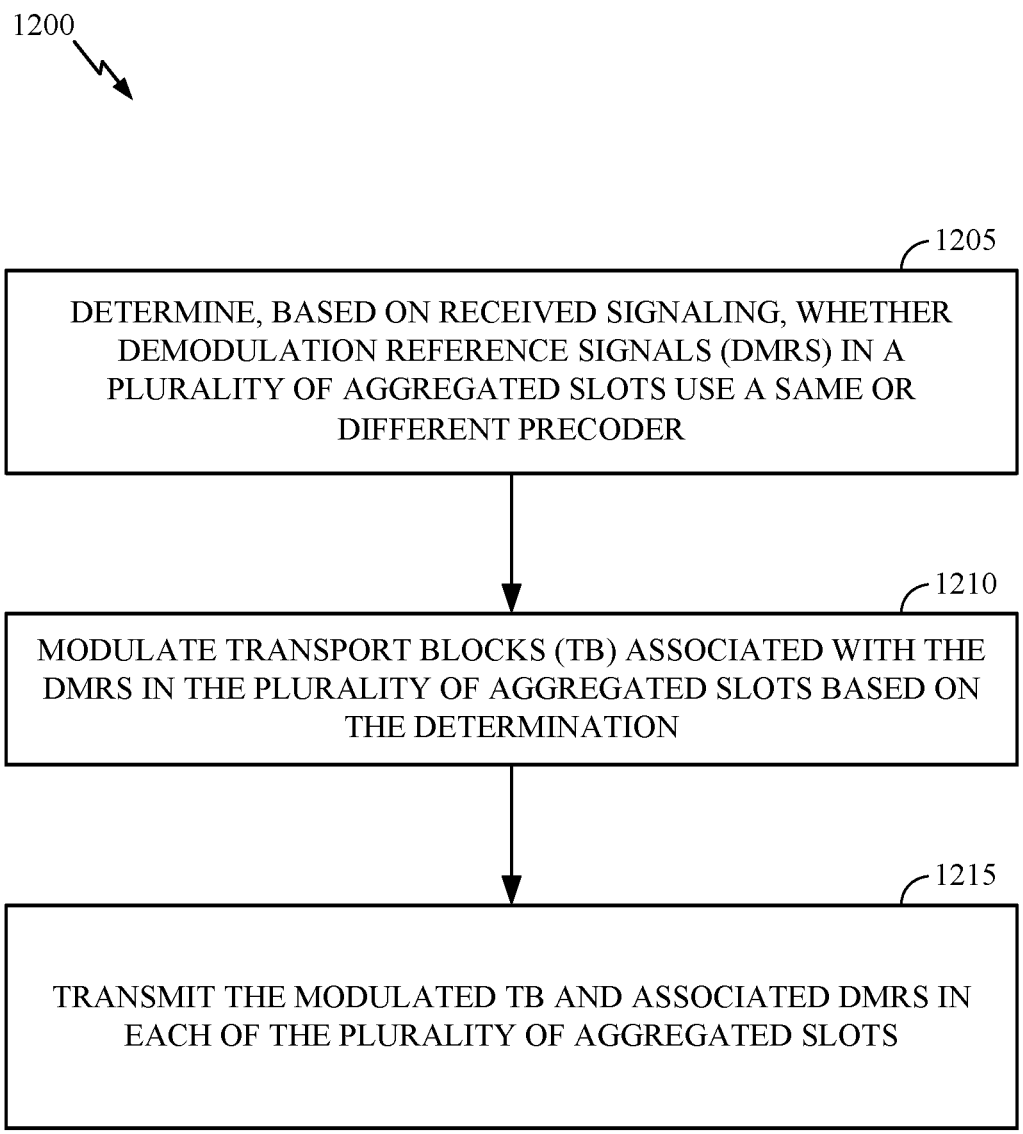
FIG. 12 is a flow diagram illustrating example operations that may be performed by a UE for receiving signaling for DMR) phase continuity and DMRS modulation, in accordance with certain aspects of the present disclosure.

FIG. 12 is a flow diagram illustrating example operations 1200 for wireless communications, in accordance with certain aspects of the present disclosure. The operations 1200 may be performed by the UE. The operations 1200 may begin, at 1205, by determining, based on received signaling, whether DMRS in a plurality of aggregated slots use a same or different precoder. At 1210, the UE modulates TBs associated with the DMRS in the plurality of aggregated slots based on the determination. And at 1215, the UE transmits the modulated TBs and associated DMRS in each of the plurality of aggregated slots.

Figure 13:
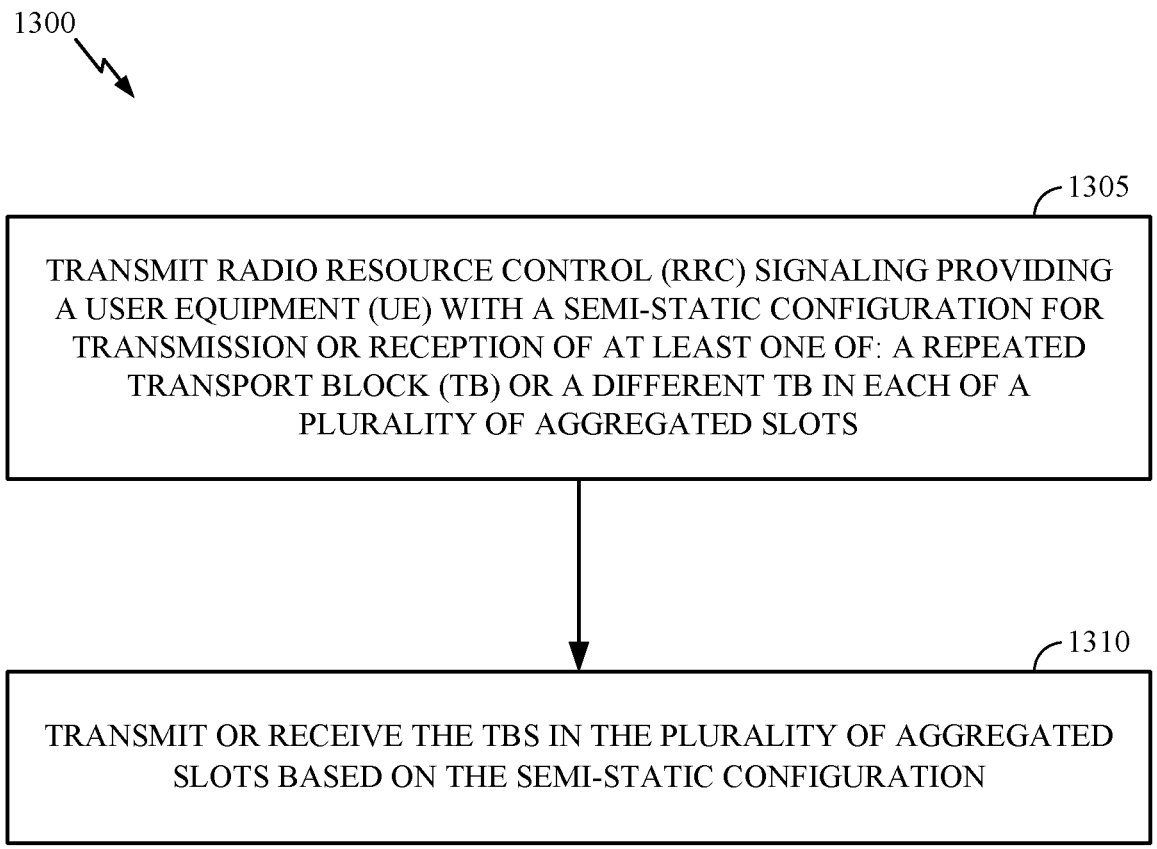
FIG. 13 is a flow diagram illustrating example operations that may be performed by a BS to signal slot aggregation, in accordance with certain aspects of the present disclosure.

FIG. 13 is a flow diagram illustrating example operations 1300 for wireless communication, in accordance with certain aspects of the present disclosure. The operations 1300 may be performed by a BS (e.g., such as a BS 110 in the wireless communication network 100 illustrated in FIG. 1, which may be a gNB). The operations 1300 may be complementary to the operations 1000, 1000A, and/or 1000B performed by the UE. Operations 1300 may be implemented as software components that are executed and run on one or more processors (e.g., processor 440 of FIG. 4). Further, the transmission and reception of signals by the BS in operations 1300 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

The operations 1300 may begin, at 1305, by transmitting RRC signaling providing a UE with a semi-static configuration for transmission or reception of a repeated TB and/or a different TB in each of a plurality of aggregated slots. At 1310, the BS transmits or receives the TBs in the plurality of aggregated slots based on the semi-static configuration.

Figure 14:
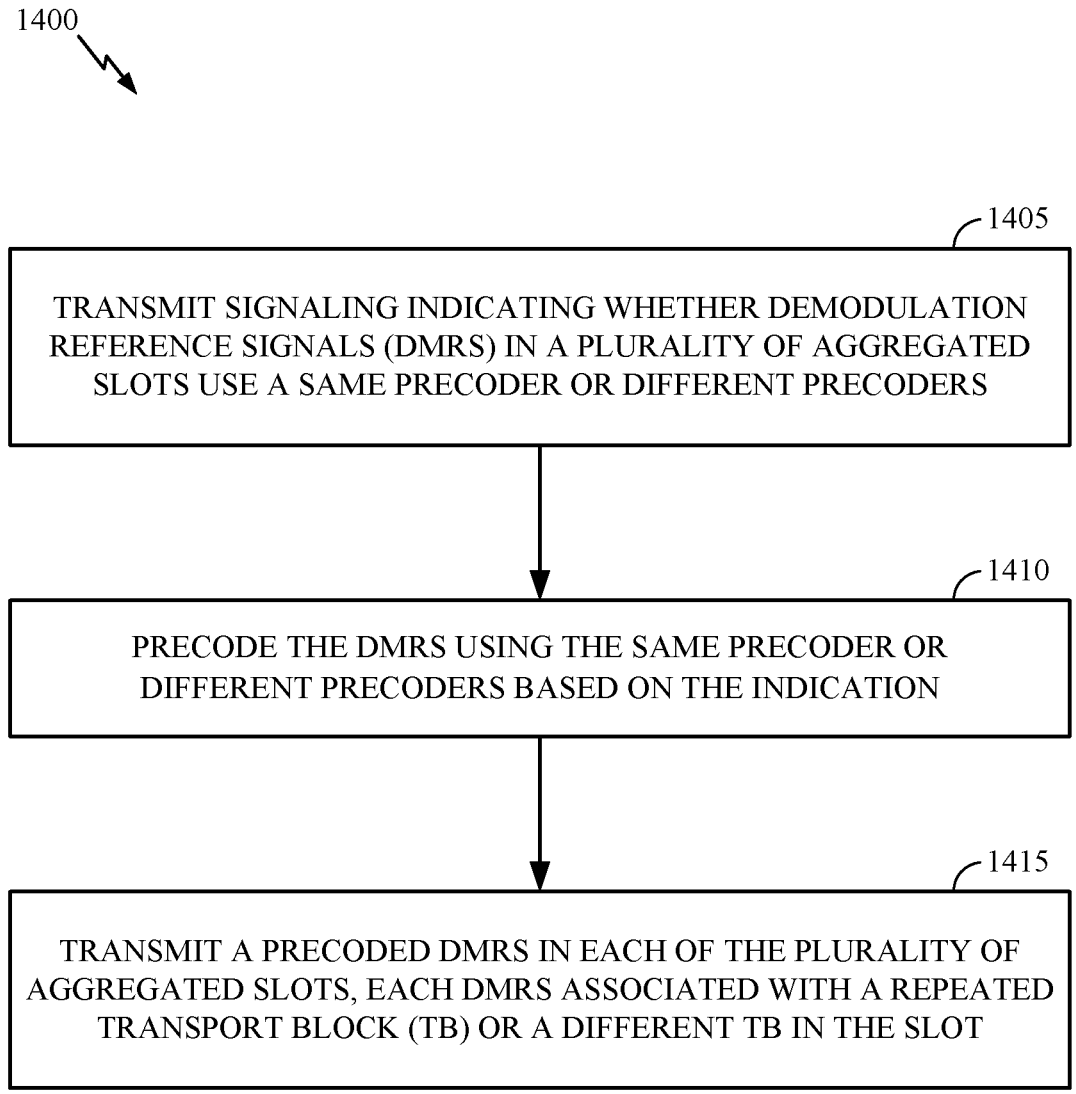
FIG. 14 is a flow diagram illustrating example operations that may be performed by a BS to signal DMRS phase continuity and DMRS modulation, in accordance with certain aspects of the present disclosure.

FIG. 14 is a flow diagram illustrating example operations 1400 for wireless communication, in accordance with certain aspects of the present disclosure. The operations 1400 may be performed by a BS. The operations 1400 may be complementary operations by the BS to the operations 1100 performed by the UE. The operations 1400 may begin, at 1405, by transmitting signaling indicating whether DMRS in a plurality of aggregated slots use a same precoder or different precoders. At 1410, the BS precodes the DMRS using the same precoder or different precoders, based on the indication. At 1415, the BS transmits a precoded DMRS in each of the plurality of aggregated slots. Each DMRS is associated with a repeated TB or a different TB in the slot.

Figure 15:
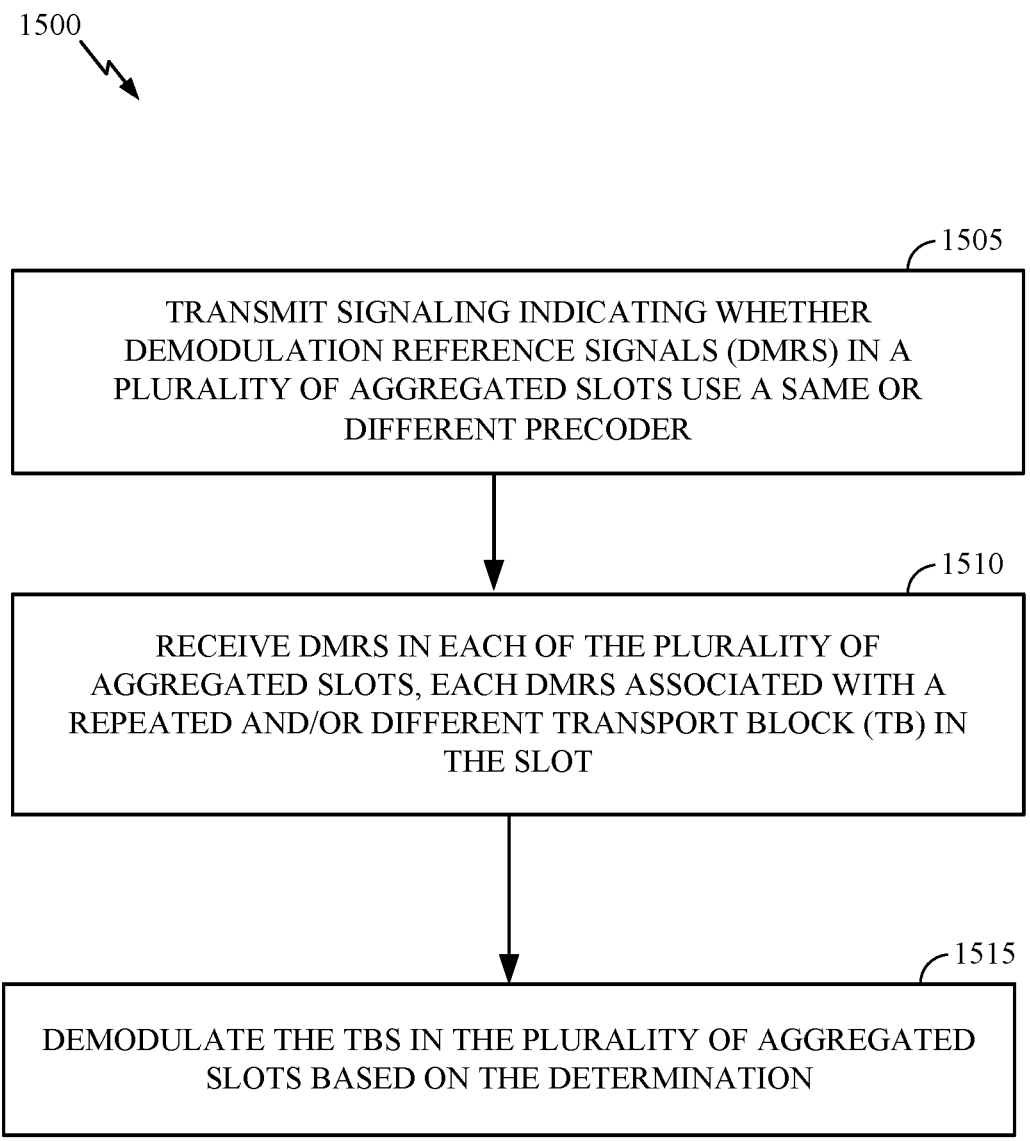
FIG. 15 is a flow diagram illustrating example operations that may be performed by a BS to signal DMRS phase continuity and DMRS demodulation, in accordance with certain aspects of the present disclosure.

FIG. 15 is a flow diagram illustrating example operations 1500 for wireless communication, in accordance with certain aspects of the present disclosure. The operations 1500 may be performed by a BS. The operations 1500 may be complementary operations by the BS to the operations 1200 performed by the UE. The operations 1500 may begin, at 1505, by transmitting signaling indicating whether DMRS in a plurality of aggregated slots use a same or different precoder. At 1510, the BS receives DMRS in each of the plurality of aggregated slots, each DMRS associated with a same and/or different TB in the slot. And at 1515, the BS demodulates the TBs in the plurality of aggregated slots based on the determination.

Example Signaling for Multi-TB Slot Aggregation

In some cases, RRC signaling is used to configure whether there is TB repetition across multiple slots (uplink or downlink). For example, repetitions may be associated with a bundled PDSCH. The gNB can transmit DCI to schedule the UE for the repetitions. Repetition may be useful for Rank-1 scenarios, where multiple-input multiple-output (MIMO) transmission is not used (e.g., in the case of a poor channel).

In some cases, repetition is not configured and different TBs are scheduled in the aggregated slots. Using a DCI to schedule the different TBs may require large DCI overhead. According to certain aspects, RRC signaling may be used to semi-statically configure parameters of slot aggregation, which may reduce DCI overhead.

In some examples (referred to herein as Case 0), multiple DCI can be used for multi-TB slot aggregation. The DCIs may have different K0 values (e.g., the HARQ value for the gap between the downlink grant and the downlink data transmission). The DCIs may be sent in the control region (e.g., the PDCCH) of a single slot (e.g., FDMed) as shown in FIG. 9. The DCIs may be sent in a first slot and then DCI may not be scheduled/sent in the subsequent aggregated slots. The number of DCIs may be restricted to fit among blind decoding candidates that the UE is able to monitor (e.g., configured to monitor).

According to certain aspects, in some examples (referred to herein as Case 1), RRC signaling is used to semi-statically configure parameters of the slot aggregation. The RRC signaling may be UE-specific. The RRC signaling may be transmitted in a higher layer RRC message. The RRC signaling may be transmitted once the UE is in connected mode. Semi-statically configuring the slot aggregation in RRC may allow a single DCI to be used to schedule multi-TB slot aggregation. The RRC signaling may indicate to the UE to monitor for a particular type of DCI format implicitly indicating the slot aggregation is used. Or the RRC could explicitly indicate slot aggregation.

RRC aggregation parameters may be reused, but with new values for to indicate the case of non-repetition aggregation (i.e., multiple different TBs). The same resource allocation may be repeated (e.g., in time and frequency). Different TBs are scheduled per slot. The RRC signaling may indicate whether the same or different MCS, NDI, and/or RV is configured across the aggregated slots. The RRC signaling may configure whether a single ARI is used for an ACK bundled (e.g., implicitly) across the TBs in the aggregated slots.

Rules may be applied for numbering (e.g., indexing) and semi-static downlink/uplink handling (i.e., the slot structure). In an illustrative example, the UE may be configured/ indicated an 8 slot aggregation; however, based on the cell configurations, the UE may know that some of the slots are configured for uplink. Thus, the UE may be configured with a rule for handling the indexing of the TBs and handling of the slot aggregation with conflicting slot directions. Indexing may define which bit in ACK feedback corresponds to which TB.

In some examples (referred to herein as Case 2), a new DCI format may be used for multi-TB aggregation. The new DCI format may be large in size to schedule multiple TBs.

According to certain aspects, subsequent DCI transmissions may dynamically configure aggregation parameters and/or may reconfigure or override one or more of the semi-statically configured parameters.

Example Signaling for DMRS Phase Continuity in Aggregated Slots

According to certain aspects, RRC signaling (e.g., separate from the above RRC signaling for the aggregation parameters) can be used to configure/indicate whether the DMRS across the uplink and/or downlink aggregated slots are phase continuous or phase discontinuous. In some cases, the indication is provided in DCI. In some cases, the indication provided in DCI may reconfigure or override a previous indication in RRC signaling. Parameter setting may depend on whether slots are scheduled as aggregated, but allows network to precoder cycle. This can apply to case of different TBs or case of TB repetitions. The signaling may be different/separate for UL and DL.

For the Case 0, described above, the UE may be signaled or configured to know whether to assume DMRS phase continuity. According to certain aspects, the indication may be an explicit indication to the UE of whether to assume DMRS phase continuity (and coherent combining). In some examples, the indication may configure the UE to assume phase continuous DMRS if repetition is along contiguous DL slots. The contiguous DL slots may include downlink slots or {DL, X} from the subframe indication (e.g., the SFI) (if signaled). The X slots may refer to slots that have an unknown direction or that are reserved. In some examples, the signaling may configure the UE to assume phase continuous DMRS for repetition along contiguous UL slots.

For the Case 1 and/or the Case 2, described above, DMRS phase continuity may be implicit from the RRC/DCI signaling configuring the aggregated slots for different TBs. For example, the RRC signaling may configure the UE to monitor for a particular type of DCI and to assume DMRS phase continuity if the type of DCI is detected.

According to certain aspects, certain slot aggregation parameters or UE behavior for assuming DMRS phase continuity may be specified in the wireless standards.

Example HARQ for Multi-TB Slot Aggregation

In some examples, multi-TB slot aggregation may reuse HARQ timing following distributed N1 or may use a new HARQ timeline.

In certain systems, such as NR, UE processing time capability for slot-based scheduling, including CA case with no cross-carrier scheduling (in some cases, the processing times may also be supported for cross-carrier scheduling), and with single numerology for PDCCH, PDSCH, and PUSCH and no UCI multiplexing, is shown in the Table 1600 in FIG. 16. The Table 1700 in FIG. 17 shows the UE processing time capability for a UE supporting a more aggressive processing time capability. Each of the minimum (K1, K2) is based on assumptions of a respective UE turn-around times (N1, N2), where K1 is the delay between DL data reception and the corresponding UL ACK transmission; K2 is the delay between reception of the UL grant in the DL and the corresponding UL data transmission; N1 is the number of OFDM symbols for UE processing from the end of PDSCH reception to the earliest possible start of the corresponding ACK/NACK transmission from UE perspective; and N2 is the number of OFDM symbols for UE processing from the end of PDCCH containing the UL grant reception to the earliest possible start of the corresponding PUSCH transmission from UE perspective. For a given configuration and numerology, a UE indicates only one capability for N1 and N2 based on corresponding entry for N1 and N2 from either Table 1600 or 1700.

Figure 18:
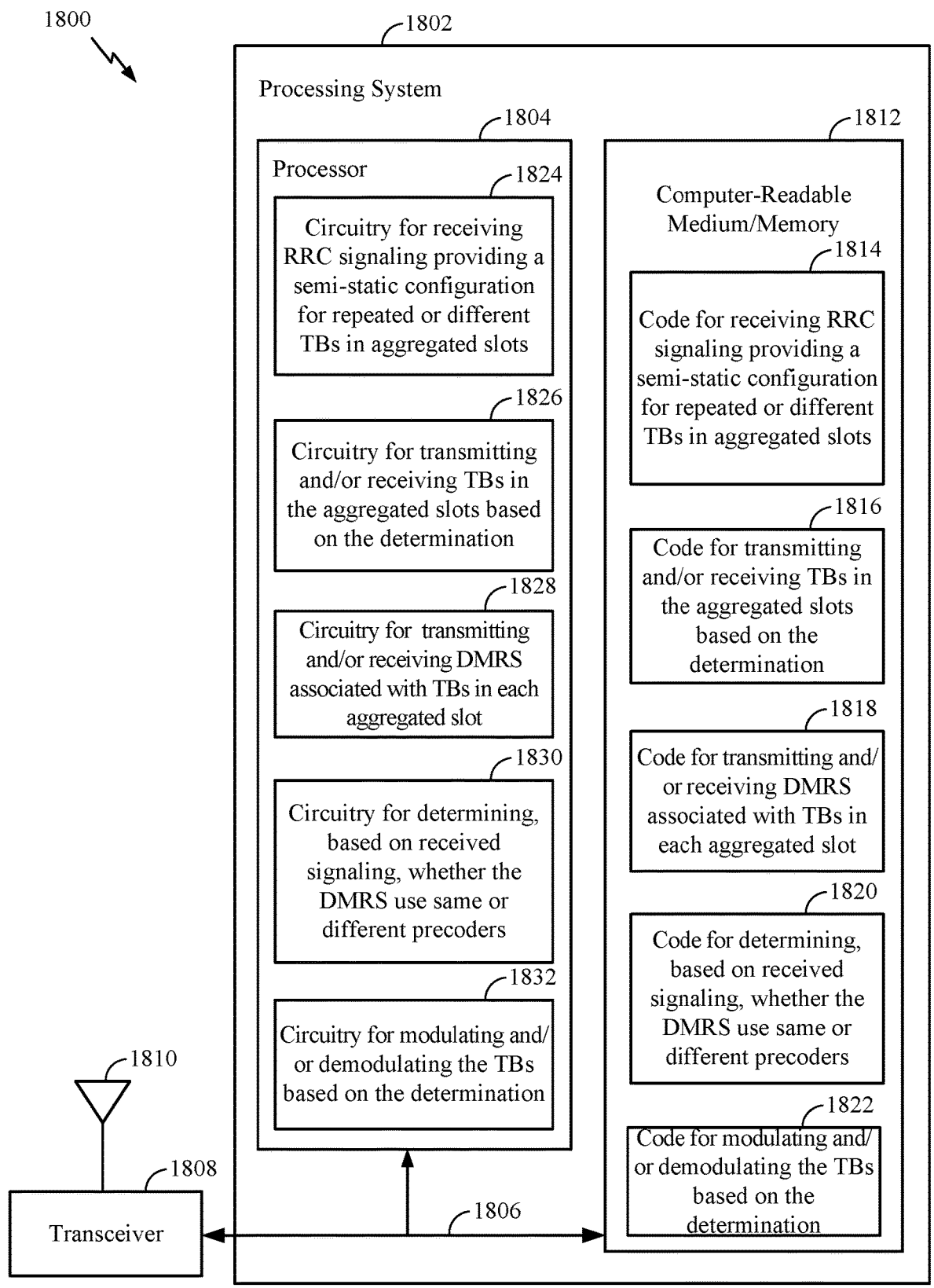
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 10, FIG. 11, and/or FIG. 12. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 10, FIG. 11, and/or FIG. 12, or other operations for performing the various techniques discussed herein for slot aggregation signaling. In certain aspects, computer-readable medium/memory 1812 stores code 1814 for receiving RC signaling providing the UE with a semi-static configuration for transmission or reception of a repeated and/or a different TB in each of a plurality of aggregated slots; code 1816 for transmitting or receiving the TBs in the plurality of aggregated slots based on the semi-static configuration; code 1818 for transmitting and/or receiving a DMRS in each of a plurality of aggregated slots, each DMRS associated with a repeated or different TB in the slot; code 1820 for determining, based on received signaling, whether the DMRS use a same precoder or a different precoder; and/or code 1822 for modulating and/or demodulating the TBs in the plurality of aggregated slots based on the determination. In certain aspects, the processor 1804 has circuitry configured to implement the code stored in the computer-readable medium/memory 1812. The processor 1804 includes circuitry 1824 for receiving RC signaling providing the UE with a semi-static configuration for transmission or reception of a repeated and/or a different TB in each of a plurality of aggregated slots; circuitry 1826 for transmitting or receiving the TBs in the plurality of aggregated slots based on the semi-static configuration; circuitry 1828 for transmitting and/or receiving a DMRS in each of a plurality of aggregated slots, each DMRS associated with a repeated or different TB in the slot; circuitry 1830 for determining, based on received signaling, whether the DMRS use a same precoder or a different precoder; and/or circuitry 1832 for modulating and/or demodulating the TBs in the plurality of aggregated slots based on the determination.

Figure 19:
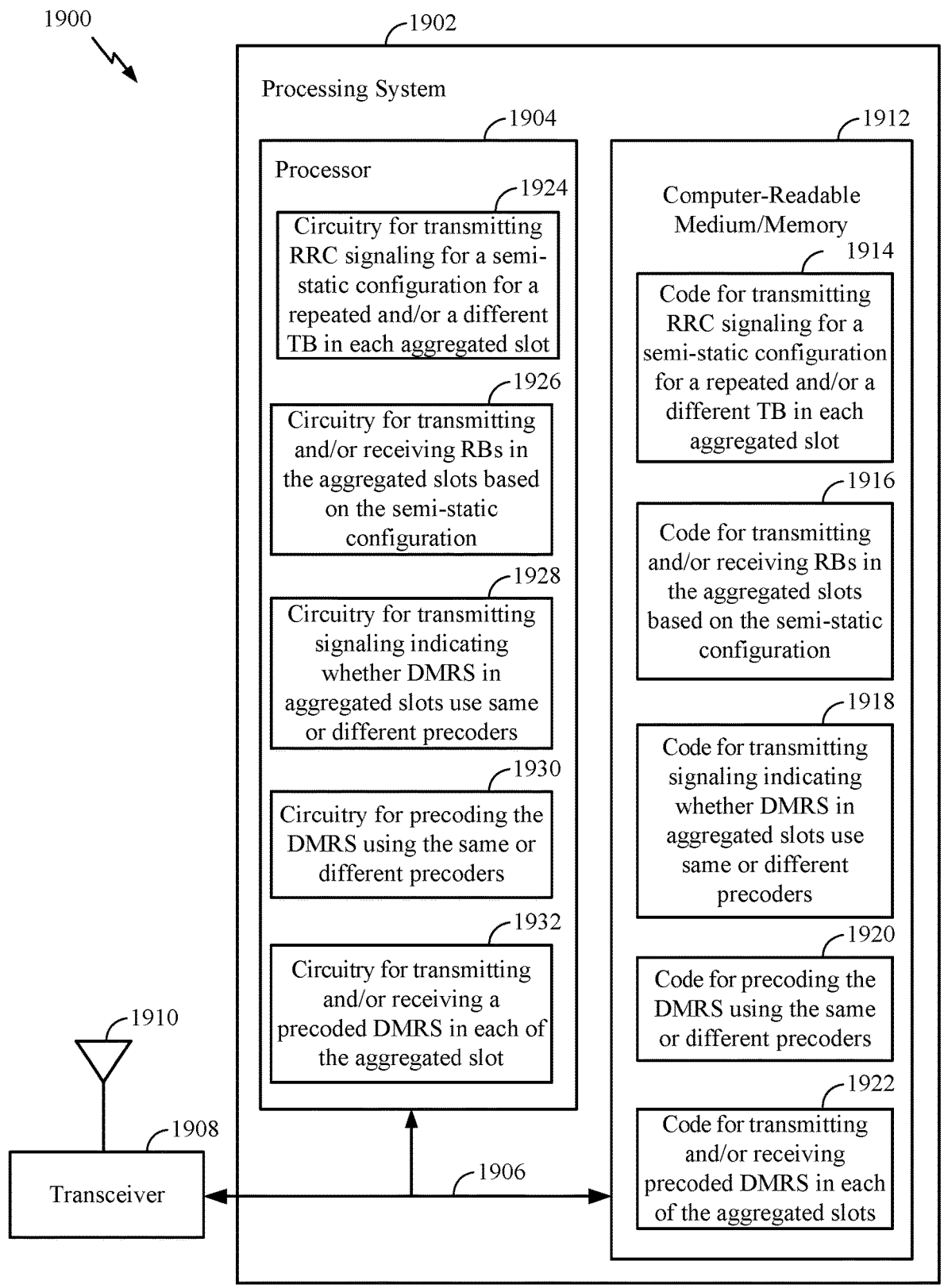
FIG. 19 illustrates a communications device that may include various components configured to perform operations for the techniques disclosed herein in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIG. 13, FIG. 14, and/or FIG. 15. The communications device 1900 includes a processing system 1902 coupled to a transceiver 1908. The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations illustrated in FIG. 13, FIG. 14, and/or FIG. 15, or other operations for performing the various techniques discussed herein for slot aggregation signaling. In certain aspects, computer-readable medium/memory 1912 stores code 1914 for transmitting RRC signaling providing a UE with a semi-static configuration for transmission or reception of a repeated TB and/or a different TB in each of a plurality of aggregated slots; code 1916 for transmitting or receiving the TBs in the plurality of aggregated slots based on the semi-static configuration; code 1918 for transmitting signaling indicating whether DMRS in a plurality of aggregated slots use a same precoder or different precoders; code 1920 for precoding the DMRS using the same precoder or different precoders, based on the indication; and/or code 1922 for transmitting and/or receiving a precoded DMRS in each of the plurality of aggregated slots. Each DMRS is associated with a repeated TB or a different TB in the slot. In certain aspects, the processor 1904 has circuitry configured to implement the code stored in the computer-readable medium/memory 1912. The processor 1904 includes circuitry 1924 for transmitting RRC signaling providing a UE with a semi-static configuration for transmission or reception of a repeated TB and/or a different TB in each of a plurality of aggregated slots; circuitry 1926 for transmitting or receiving the TBs in the plurality of aggregated slots based on the semi-static configuration; circuitry 1928 for transmitting signaling indicating whether DMRS in a plurality of aggregated slots use a same precoder or different precoders; circuitry 1930 for precoding the DMRS using the same precoder or different precoders, based on the indication; and/or circuitry 1932 for transmitting and/or receiving a precoded DMRS in each of the plurality of aggregated slots. Each DMRS is associated with a repeated TB or a different TB in the slot.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein for slot aggregation signaling.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), comprising:
   receiving radio resource control (RRC) signaling providing the UE with a semi-static configuration for transmission or reception of a repeated transport block (TB) in each of a plurality of aggregated slots, the semi-static configuration including at least one of: a new data indicator (NDI), a redundancy version (RV) or an acknowledgment resource indicator (ARI) for a bundled ACK associated with the transmission or reception of the repeated TB in the plurality of aggregated slots; and
   transmitting or receiving the repeated TB in the plurality of aggregated slots based on the semi-static configuration.

2. The method of claim 1, further comprising:
   receiving a downlink control information (DCI) transmission scheduling the UE to transmit or receive repetitions of the TB, associated with a same hybrid automatic repeat request (HARQ) process, in the plurality of aggregated slots.

3. The method of claim 2, wherein the repetitions of the TB in the plurality of aggregated slots are associated with a physical downlink shared channel (PDSCH).

4. The method of claim 1, further comprising:
   receiving a downlink control information (DCI) transmission scheduling the UE to transmit or receive different TBs, associated with different hybrid automatic repeat request (HARQ) processes, in the plurality of aggregated slots.

5. The method of claim 1, further comprising:
   receiving or transmitting a single acknowledgement bit indicating whether the repeated TB in the plurality of aggregated slots was successfully received.

6. The method of claim 1, wherein the semi-static configuration further includes at least one of:
   a resource allocation (RA) or a modulation and coding scheme (MCS), associated with transmission of the repeated TB in the plurality of aggregated slots.

7. The method of claim 6, wherein at least one of: a same RA, a same MCS, a same NDI, a same RV, or a same ARI is configured for transmission of the repeated TB in the plurality of aggregated slots.

8. The method of claim 1, further comprising:
   receiving downlink control information (DCI) providing a dynamic configuration for transmission or reception of the repeated TB in the plurality of aggregated slots, wherein the dynamic configuration is different than the semi-static configuration.

9. The method of claim 1, wherein the signaling comprises separate signaling for uplink and downlink slot aggregation.

10. An apparatus for wireless communications, comprising:
    means for receiving radio resource control (RRC) signaling providing the apparatus with a semi-static configuration for transmission or reception of a repeated transport block (TB) in each of a plurality of aggregated slots, the semi-static configuration including at least one of: a new data indicator (NDI), a redundancy version (RV) or an acknowledgment resource indicator (ARI) for a bundled ACK associated with the transmission or reception of the repeated TB in the plurality of aggregated slots; and
    means for transmitting or receiving the repeated TB in the plurality of aggregated slots based on the semi-static configuration.

11. The apparatus of claim 10, further comprising means for receiving a downlink control information (DCI) transmission scheduling the apparatus to transmit or receive repetitions of the TB, associated with a same hybrid automatic repeat request (HARQ) process, in the plurality of aggregated slots.

12. The apparatus of claim 11, wherein the repetitions of the TB in the plurality of aggregated slots are associated with a physical downlink shared channel (PDSCH).

13. The apparatus of claim 10, further comprising means for receiving a downlink control information (DCI) transmission scheduling the apparatus to transmit or receive different TBs, associated with different hybrid automatic repeat request (HARQ) processes, in the plurality of aggregated slots.

14. The apparatus of claim 10, further comprising means for receiving or transmitting a single acknowledgement bit indicating whether the repeated TB in the plurality of aggregated slots were successfully received.

15. The apparatus of claim 10, wherein the semi-static configuration further includes at least one of: a resource allocation (RA) or a modulation and coding scheme (MCS) associated with transmission of the repeated TB in the plurality of aggregated slots.

16. The apparatus of claim 15, wherein at least one of: a same RA, a same MCS, a same NDI, a same RV, or a same ARI is configured for transmission of the repeated TB in the plurality of aggregated slots.

17. The apparatus of claim 10, further comprising means for receiving downlink control information (DCI) providing a dynamic configuration for transmission or reception of the repeated TB in the plurality of aggregated slots, wherein the dynamic configuration is different than the semi-static configuration.

18. An apparatus of wireless communications, comprising:
at least one processor; and
a memory coupled to the at least one processor, the memory comprising code executable by the at least one processor to cause the apparatus to:
receive radio resource control (RRC) signaling providing the apparatus with a semi-static configuration for transmission or reception of a repeated transport block (TB) in each of a plurality of aggregated slots, the semi-static configuration including at least one of: a new data indicator (NDI), a redundancy version (RV) or an acknowledgment resource indicator (ARI) for a bundled ACK associated with the transmission or reception of the repeated TB in the plurality of aggregated slots; and
transmit or receive the repeated TB in the plurality of aggregated slots based on the semi-static configuration.

19. The apparatus of claim 18, the code further executable by the at least one processor to cause the apparatus to:
receive a downlink control information (DCI) transmission scheduling the apparatus to transmit or receive repetitions of the TB, associated with a same hybrid automatic repeat request (HARQ) process, in the plurality of aggregated slots.

20. The apparatus of claim 19, wherein the repetitions of the TB in the plurality of aggregated slots are associated with a physical downlink shared channel (PDSCH).

21. The apparatus of claim 18, the code further executable by the at least one processor to cause the apparatus to:
receive a downlink control information (DCI) transmission scheduling the apparatus to transmit or receive different TBs, associated with different hybrid automatic repeat request (HARQ) processes, in the plurality of aggregated slots.

22. The apparatus of claim 18, the code further executable by the at least one processor to cause the apparatus to:
receive or transmit a single acknowledgement bit indicating whether the repeated TB in the plurality of aggregated slots were successfully received.

23. The apparatus of claim 18, wherein the semi-static configuration further includes at least one of:
a resource allocation (RA) or a modulation and coding scheme (MCS) associated with transmission of the repeated TB in the plurality of aggregated slots.

24. The apparatus of claim 23, wherein at least one of: a same RA, a same MCS, a same NDI, a same RV, or a same ARI is configured for transmission of the repeated TB in the plurality of aggregated slots.

25. The apparatus of claim 18, the code further executable by the at least one processor to cause the apparatus to:
receive downlink control information (DCI) providing a dynamic configuration for transmission or reception of the repeated TB in the plurality of aggregated slots, wherein the dynamic configuration is different than the semi-static configuration.

26. The apparatus of claim 18, wherein the signaling comprises separate signaling for uplink and downlink slot aggregation.

27. A non-transitory computer readable medium storing computer executable code thereon for wireless communications by a user equipment (UE), comprising:
code for receiving radio resource control (RRC) signaling providing the UE with a semi-static configuration for transmission or reception of a repeated transport block (TB) in each of a plurality of aggregated slots, the semi-static configuration including a redundancy version (RV) and an acknowledgment resource indicator (ARI) for a bundled ACK associated with the transmission or reception of the repeated TB in the plurality of aggregation slots; and
code for transmitting or receiving the repeated TB in the plurality of aggregated slots based on the semi-static configuration.

28. The non-transitory computer readable medium of claim 27, wherein the computer executable code further comprises:
code for receiving a downlink control information (DCI) transmission scheduling the UE to transmit or receive repetitions of the TB, associated with a same hybrid automatic repeat request (HARQ) process, in the plurality of aggregated slots.

29. The non-transitory computer readable medium of claim 28, wherein the repetitions of the TB in the plurality of aggregated slots are associated with a physical downlink shared channel (PDSCH).

30. The non-transitory computer readable medium of claim 28, wherein the computer executable code further comprises:
code for receiving a downlink control information (DCI) transmission scheduling the UE to transmit or receive different TBs, associated with different hybrid automatic repeat request (HARQ) processes, in the plurality of aggregated slots.

* * * * *